United States Patent
Elzur (10) Patent No.: US 8,244,890 B2
(45) Date of Patent: Aug. 14, 2012

(54) SYSTEM AND METHOD FOR HANDLING TRANSPORT PROTOCOL SEGMENTS

(75) Inventor: Uri Elzur, Irvine, CA (US)

(73) Assignee: Broadcom Corporation, Irvine, CA (US)

(*) Notice: Subject to any disclaimer, the term of this patent is extended or adjusted under 35 U.S.C. 154(b) by 2221 days.

(21) Appl. No.: 10/751,732

(22) Filed: Jan. 2, 2004

(65) Prior Publication Data

US 2004/0153578 A1   Aug. 5, 2004
US 2010/0174831 A9   Jul. 8, 2010

Related U.S. Application Data

(63) Continuation-in-part of application No. 10/230,643, filed on Aug. 29, 2002, now Pat. No. 7,295,555.

(60) Provisional application No. 60/456,322, filed on Mar. 20, 2003, provisional application No. 60/437,887, filed on Jan. 2, 2003, provisional application No. 60/363,381, filed on Mar. 8, 2002, provisional application No. 60/363,356, filed on Mar. 11, 2002, provisional application No. 60/372,851, filed on Apr. 16, 2002, provisional application No. 60/372,852, filed on Apr. 16, 2002.

(51) Int. Cl.
  *G06F 15/16* (2006.01)
(52) U.S. Cl. ............... 709/230; 709/236; 709/250
(58) Field of Classification Search ............ 709/230, 709/236, 250
See application file for complete search history.

(56) References Cited

U.S. PATENT DOCUMENTS

| | | | |
|---|---|---|---|
| 6,356,944 B1 | 3/2002 | McCarty | |
| 6,845,403 B2 | 1/2005 | Chadalapaka | |
| 7,031,904 B1 * | 4/2006 | Wilson et al. | 709/230 |
| 7,124,198 B2 * | 10/2006 | Pinkerton | 709/236 |
| 2001/0037397 A1 | 11/2001 | Boucher et al. | |
| 2003/0084185 A1 | 5/2003 | Pinkerton | |
| 2004/0003126 A1 * | 1/2004 | Boucher et al. | 709/250 |
| 2004/0073703 A1 * | 4/2004 | Boucher et al. | 709/245 |

OTHER PUBLICATIONS

Culley P et al: "draft-culley-iwarp-mpa-00: Marker PDU Aligned Framing for TCP Specification" Internet Engineering Task Force Internet Draft, Sep. 2002, pp. 1-31.
Bailey S et al: "TCP ULP Framing Protocol (TOF)" Internet Engineering Task Force Internet Draft, Nov. 2001, pp. 1-30.
David Black: Internet Citation, Online, Jan. 15, 2001, pp. 1-12, Draft San Diego minutes retrieved from the Internet Mar. 3, 2004, p. 1, line 29-p. 3, line 5.
Culley, Elzur, Recio, Bailey: "draft-culley-iwarp-mpa-00: Marker PDU Aligned Framing for TCP Specification" Internet Drafts Archive, Sep. 2002, pp. 1-31.
Bailey, Chase, Pinkerton, Romanow, Sapuntzakis, Wendt, Williams: "draft-ietf-tsvwg-tcp-ulp-frame-01: TCP ULP Framing Protocol (TUF)" Internet Drafts Archive, Nov. 2001, pp. 1-30.

* cited by examiner

*Primary Examiner* — Kyung H Shin
(74) *Attorney, Agent, or Firm* — Thomas, Kayden, Horstemeyer & Risley, LLP (57) ABSTRACT

Systems and methods that handle transport protocol segments (TPSes) are provided. In one embodiment, a system may include, for example, a receiver that may receive an incoming TPS. The incoming TPS may include, for example, an aligned upper layer protocol (ULP) header and a complete ULP data unit (ULPDU). The receiver may directly place the complete ULPDU into a host memory.

41 Claims, 9 Drawing Sheets

SYSTEM AND METHOD FOR HANDLING TRANSPORT PROTOCOL SEGMENTS

CROSS-REFERENCE TO RELATED APPLICATIONS

This application makes reference to, claims priority to and claims benefit from U.S. Provisional Patent Application Ser. No. 60/437,887, entitled "Header Alignment and Complete PDU" and filed on Jan. 2, 2003; and U.S. Provisional Patent Application Ser. No. 60/456,322, entitled "System and Method for Handling Transport Protocol Segments" and filed on Mar. 20, 2003.

This application is a continuation-in-part of U.S. patent application Ser. No. 10/230,643, filed Aug. 29, 2002, now issued U.S. Pat. No. 7,295,555 B2. Said U.S. patent application Ser. No. 10/230,643 makes reference to, claims priority to and claims benefit from U.S. Provisional Patent Application No. 60/372,851, filed Apr. 16, 2002; U.S. Provisional Patent Application No. 60/372,852, filed Apr. 16, 2002; U.S. Provisional Patent Application No. 60/363,356, filed Mar. 11, 2002; and U.S. Provisional Patent Application No. 60/363,381, filed Mar. 8, 2002.

INCORPORATION BY REFERENCE

The above-referenced United States patent applications are hereby incorporated herein by reference in their entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Figure 1:
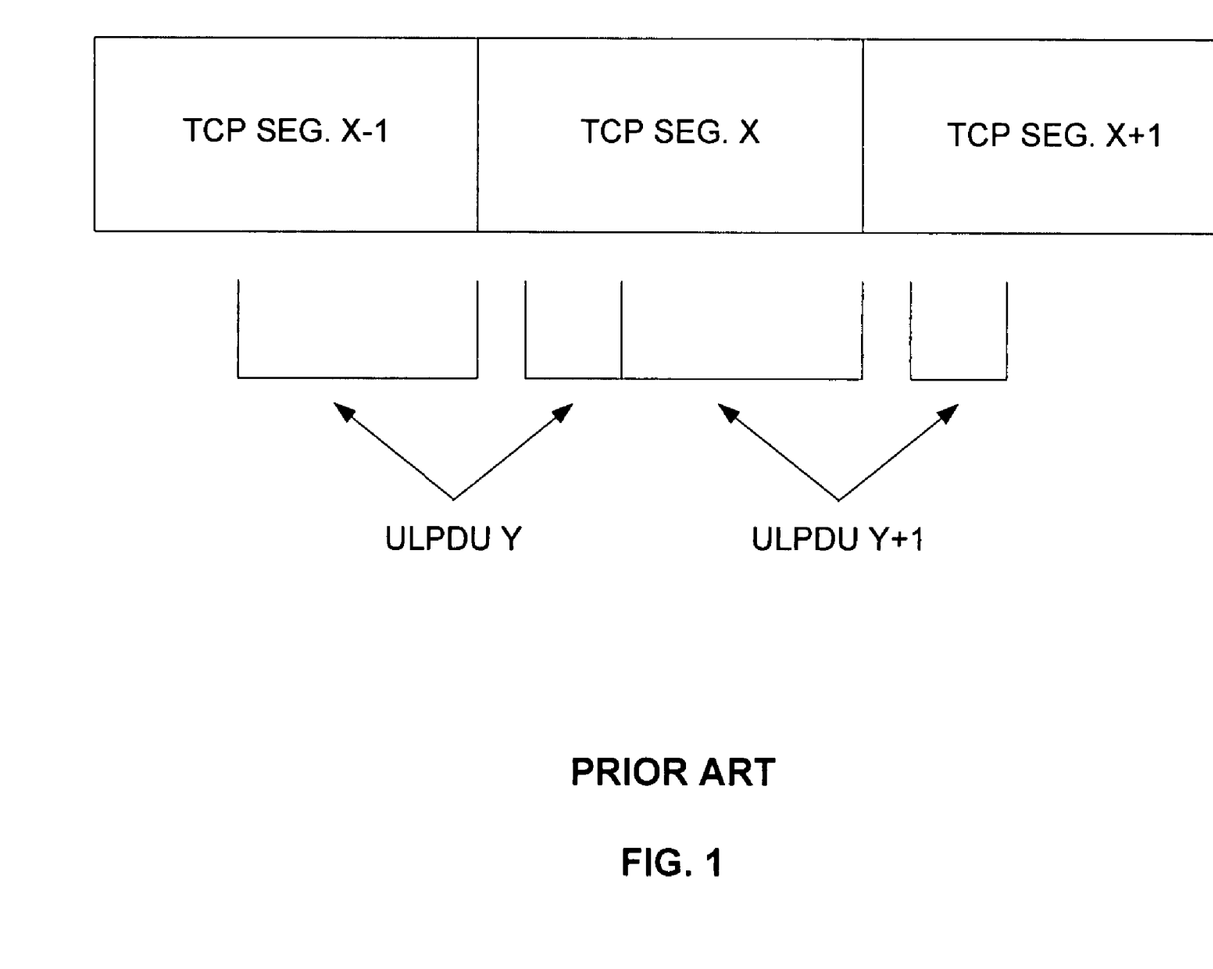
FIG. 1 shows an upper layer protocol data unit (ULPDU) carried by a plurality of transmission control protocol (TCP) segments.

FIG. 1 shows a conventional byte stream in accordance with a transmission control protocol (TCP). Three segments (i.e., TCP Seg. X−1, TCP Seg. X and TCP Seg. X+1) of the byte stream are illustrated. There is no guaranteed relationship between an upper layer protocol data unit (ULPDU) and TCP segments boundaries. As a result, a ULPDU may start or end in the middle of the TCP Segment. For example, two ULPDUs (e.g., ULPDU Y and ULPDU Y+1) are each carried by two TCP segments. A ULPDU may also be carried by more than two TCP segments.

In conventional systems, by carrying each ULPDU over two or more TCP segments, a network interface card (NIC) of a receiver may have to perform excessive computations and operations that can hamper NIC performance in very high speed networks such as, for example, networks with bandwidths exceeding one gigabit per second (Gbps). The receiver may have difficulty in determining the beginning of each ULPDU in, for example, a seemingly endless TCP byte stream. In addition, the receiver may need to process the IP datagram as well as TCP segments, to determine the upper layer protocol (ULP) boundaries and to perform ULP CRC before the ULPDU header placement information can be trusted. Determining the beginning of each ULPDU and trusting the ULPDU header placement information are but a few of the obstacles in developing, for example, a NIC in which the NIC, with minimum buffering or no buffering, may directly place the ULPDU data into a designated host buffer location.

Another obstacle to developing, for example, a NIC that can place ULPDUs into host memory may be the buffer memory requirements of the NIC. Since the ULPDU cannot be placed until the entire ULPDU has been buffered and respective control information analyzed, buffers are needed to accommodate, for example, out-of-order TCP segments that may disrupt the flow of ULPDUs. A TCP receiver may allocate buffers based upon, for example, a bandwidth-delay product. Thus, the buffer memory size may scale linearly with network speed. For example, an approximately tenfold increase in network speed may necessitate an approximately tenfold increase in buffer memory. This causes the total cost of a NIC for high speed network to increase to a level that makes it impractical for wide deployment. In addition, the memory may be managed on a per connection basis. Each receiver connection may require its own buffers since each ULPDU may be carried by a plurality of TCP segments. Such buffering requirements can only be accentuated as network speeds and the number of connections increase.

Further limitations and disadvantages of conventional and traditional approaches will become apparent to one of ordinary skill in the art through comparison of such systems with some aspects of the present invention as set forth in the remainder of the present application with reference to the drawings.

BRIEF SUMMARY OF THE INVENTION

Aspects of the present invention may be found in, for example, systems and methods that handle transport protocol segments (TPSes). In one embodiment, the present invention may provide a system that includes, for example, a receiver that may receive an incoming TPS. The incoming TPS may include, for example, an aligned upper layer protocol (ULP) header and a complete ULP data unit (ULPDU). The receiver may directly place the complete ULPDU into a host memory.

In another embodiment, the present invention may provide a system that handles TPSes. The system may include, for example, a sender that sends a TPS. The sent TPS may include, for example, an aligned ULP header and one or more complete ULPDUs.

In another embodiment, the present invention may provide a method that handles TPSes. The method may include, for example, one or more of the following: aligning an FPDU header in a known position in a TPS with respect to a TPS header; and placing a complete FPDU in the TPS.

In yet another embodiment, the present invention may provide a method that handles TPSes. The method may include, for example, receiving an incoming TPS. The TPS may include, for example, a complete FPDU and an FPDU header in a known position with respect to a TPS header.

In yet another embodiment, the present invention may provide a system that handles TPSes. The system may include, for example, a receiver including a direct memory access (DMA) engine. The receiver may receive an incoming TPS that includes an aligned ULP header and a complete ULPDU. The receiver may program the DMA engine once to place the complete ULPDU into a host memory.

In another embodiment, the present invention may provide a method that handles TPSes. The method may include one or more of the following: receiving an incoming TPS, the TPS comprising a complete FPDU and an FPDU header in a known position with respect to a TPS header; performing layer 2 (L2) processing on the incoming TPS; performing layer 3 (L3) processing on the incoming TPS; performing layer 4 (L4) processing on the incoming TPS; and performing ULP processing on the incoming TPS. The L2 processing, the L3 processing, the L4 processing and the ULP processing of the incoming TPS may be performed in any order.

These and other features and advantages of the present invention may be appreciated from a review of the following detailed description of the present invention, along with the accompanying figures in which like reference numerals refer to like parts throughout.

DETAILED DESCRIPTION OF THE INVENTION

If an upper layer protocol data unit (ULPDU) is not aligned within a transport segment, then the ULPDU may be carried by two or more transport protocol segments (e.g., two or more transmission control protocol (TCP) segments) and a receiver may perform layer 2 (L2) processing on incoming frames. If an Internet protocol (IP) datagram is not an IP fragment, then the L2 frame may include a complete IP datagram and layer 3 (L3) processing may be performed on the IP datagram. If an IP fragment is present in the L2 frame, then IP fragments may be reassembled in a local buffer before continuing with the processing. Some protocols (e.g., IP security (IPsec)) may include, for example, a header between an L3 header and an L4 header (or between other headers) and may be dealt with as is known in the art; however, such considerations will not be discussed further herein to simplify the discussion. Subsequently, layer 4 (L4) processing may commence including, for example, TCP processing and performing header/checksum checks. The L4 segment (e.g., a TCP segment, a stream control transmission protocol (SCTP) segment or other transport layer segment) may be classified, for example, to determine a "flow". For TCP/IP traffic this may be done using a 5-tuple including, for example, IP source information, IP destination information, TCP source port information, TCP destination port information and protocol information). State information for L3/L4 and any upper layer protocol (ULP) may then be obtained for the flow such as for a TCP connection. If the receiver has kept state for the upper layer protocol (ULP), then the boundaries of the ULPDU message may be determined. Based on the ULPDU boundaries and ULP header information, the payload boundaries along with the requested action (e.g., determining payload placement information) may be ascertained.

If a TCP segment is not received in order (e.g., the TCP segment is an out-of-order TCP segment) and if a ULPDU is not aligned within the TCP segment, then the receiver may buffer the data until a complete ULPDU is received. In most cases, it may be difficult to determine the ULPDU boundaries inside out-of-order TCP segments. The receiver may not be able to immediately calculate a ULP cyclical redundancy checking (CRC) (herein ULP CRC or CRC), if used, or may not be able to immediately place the ULP payload in a host buffer. The receiver may take action, for example, after the transport layer segment has been received in order, fully reassembled and tested for transport layer integrity and the ULPDU boundaries have been found. The receiver may buffer out-of-order transport protocol segments or may drop them. Once a complete ULPDU has been received, a process similar to receiving in-order TCP segments may be implemented.

If a TCP segment is received in order (or re-ordered by the receiver) and if a ULPDU is not aligned within the TCP segment, then receiver-managed ULP state information may be used to calculate where, in TCP segment X, for example, the previous ULPDU (e.g., ULPDU Y) ends. This operation may include, for example, the step of subtracting the number of bytes of ULPDU Y in TCP segment X−1 from the ULPDU Y length field stored by the receiver as part of the ULP state. Based on this calculation, the receiver may calculate the number of remaining bytes in TCP segment X that are part of ULPDU Y. If the ULP (e.g., an Internet small computer system interface (iSCSI) protocol, an iSCSI extensions for remote direct memory access (RDMA) (iSER) protocol or other RDMA-over-TCP protocols) employs a data integrity mechanism such as, for example, CRC, then the receiver may calculate the CRC and may check the calculated CRC against the CRC value received. The ULP may have respective CRCs for the ULPDU header and for the data or a single CRC to cover both the ULP header and data. If steering/placement information is included within the ULPDU header and if the ULPDU header has separate CRCs, then data placement may commence once the CRCs are confirmed to be error free. If a single CRC is employed for the whole ULPDU, then CRC across the ULPDU may be computed and checked before placement may begin.

Figure 7:
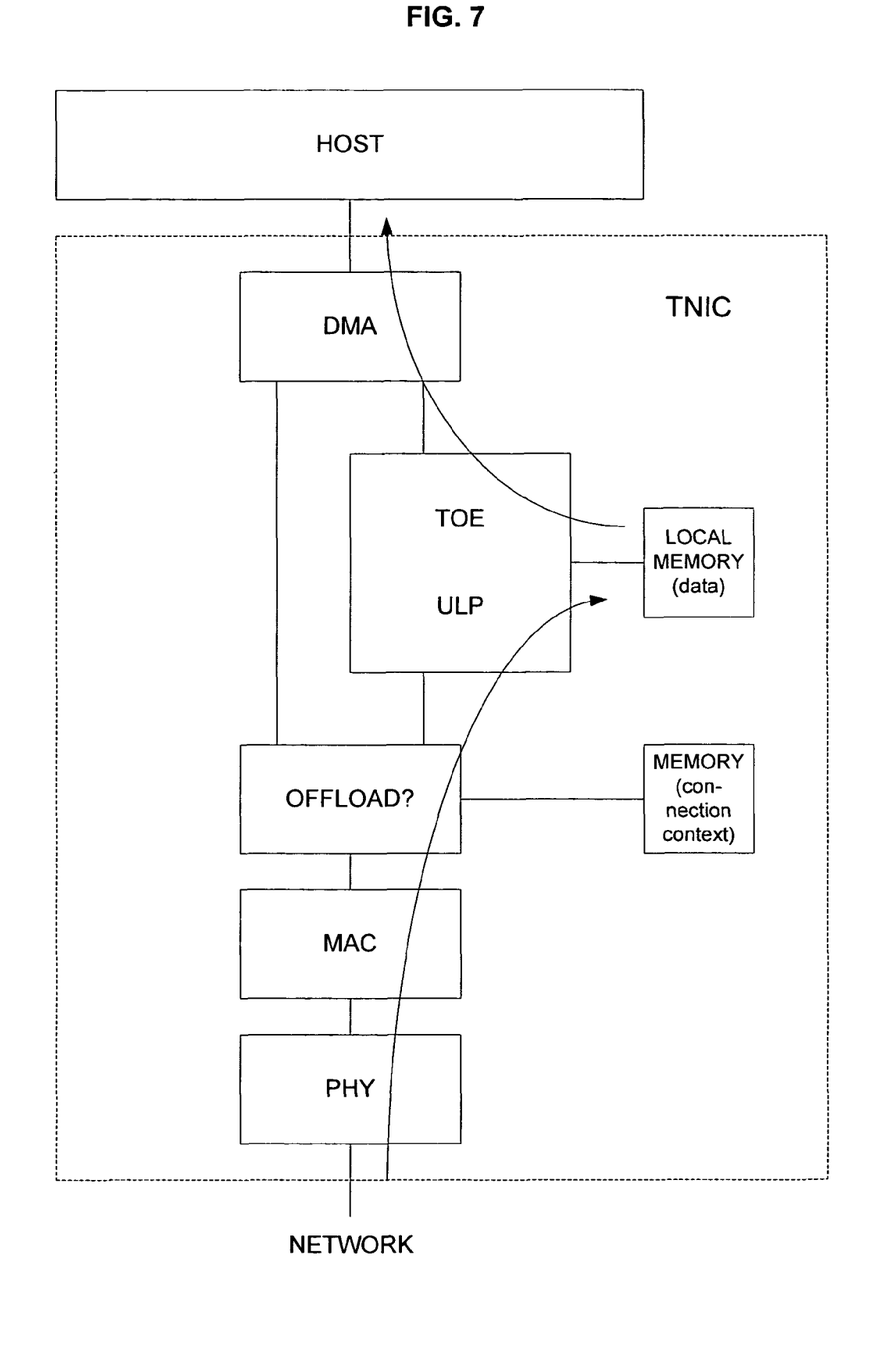
FIG. 7 shows an embodiment of a network interface card (NIC) according to the present invention.

Two embodiments for employing CRC on the receiver are discussed although the present invention may include other embodiments for employing CRC (e.g., conventional CRC). FIG. 7 shows an embodiment of an offload network interface card (NIC) operation for ULP with CRC. The NIC may be, for example, a non-flow-through NIC. In a first method, the CRC may be performed before or as the data is stored in the local buffer. The partial ULPDU CRC results, if applicable, may also be stored in the local buffer or elsewhere such as, for example, in a context memory, a host memory or on-chip. In a second method, the CRC may be performed as data is moved from local buffer to host buffer. For the first method and the second method, the CRC may be performed by one or more of the blocks illustrated in FIG. 7.

An embodiment of the processing of the ULPDU CRC for reception of a transport protocol segment (e.g., TCP segment X) with an unaligned ULPDU is described. If the first method is used and if the ULPDU is not entirely carried by the transport protocol segment (e.g., TCP segment X), then a partial CRC may have been computed when TCP segment X−1 was received. The stored partial CRC for ULPDU Y, which is a result, for example, of the bytes included in TCP segment X−1, may be fetched and loaded into a CRC circuit that is adapted to continue the CRC calculation starting from the partial CRC, instead of starting from a CRC initialization constant. The receiver may determine the number of bytes within TCP segment X that belong to ULPDU Y. The remaining bytes of ULPDU Y inside TCP segment X may be moved through the CRC machine using the services of a direct memory access (DMA) device, for example. If TCP segment X is received out of order, then the boundaries of ULPDU Y may be difficult to determine and therefore, in some cases, the CRC circuit might not be notified as to a start point or a stop point within TCP Segment X. In such a case, once TCP Segment X is in order, the NIC may determine the boundaries of ULPDU Y. The NIC may re-read the payload from the local memory to the CRC circuit to perform this task. The CRC calculation for ULPDU Y may be checked. If there are no CRC errors, then placement may be allowed. The receiver may then re-arm the DMA and the CRC mechanisms to calculate the partial CRC for ULPDU Y+1 and to store it.

If the second method is used, then data may be placed in the host buffer in parallel with performing CRC. Data may be initially stored in the local memory buffer. Once the ULPDU boundaries are determined, the receiver may add state to keep track of the end of ULPDU Y which may also mark the beginning of ULPDU Y+1. For the ULPDU Y header, the CRC may be checked when TCP segment X−1 is received or when the whole ULPDU is assembled, for example, when TCP segment X is received. If the header CRC is error free, then the steering information contained therein may be trusted. The ULPDU Y data bytes may then be placed in the host buffer. If the ULP uses just a single CRC for both the header and the data, then the CRC of the whole ULPDU is calculated before any placement may begin. Checking for errors in the CRC for the placement information included within the header before placement commences may safeguard against, for example, data being placed in the wrong host buffer location. For the first method and the second method, if a CRC error is detected, then the ULP may recover by itself.

With regard to moving the data to the host buffer, in some examples (e.g., with unaligned ULPDUs), the two portions of the ULP payload for ULPDU Y may be located in at least two separate local buffers as they were received in at least two separate frames. With regard to the first portion of the ULPDU, the local buffer for the first portion of ULPDU Y (e.g., the portion of ULPDU Y in TCP segment X−1) may be located and the DMA device may be programmed (e.g., CopyData(local buffer of first portion of ULPDU Y, host buffer address, length)). The host buffer address for the second portion of ULPDU Y (e.g., the portion of ULPDU Y in TCP segment X) may be computed and the DMA device may be programmed (e.g., CopyData(local buffer of second portion of ULPDU Y, host buffer address for second portion, length)).

With respect to moving, for example, ULPDU Y+1 to the host buffer, the receiver may continue with reception of TCP segment X, as it manages the first portion of ULPDU Y+1, which was in TCP segment X. The TCP sequence for the beginning of ULPDU Y+1 may be calculated and the byte offset into the segment may be derived therefrom. The DMA device may be programmed to move available data of ULPDU Y+1 in TCP segment X through the CRC machine, if the first method is used. The partial CRC results may be stored for ULPDU Y+1. The local buffer address of the first portion of ULPDU Y+1 (e.g., the portion of ULPDU Y+1 in TCP segment X) may be stored. If the ULP has a separate CRC for the header and if the header has been fully received and has been found to be error free, then the first ULP payload portion of ULPDU Y+1 may be stored in the host buffer. This may assume that TCP processing has been completed with no errors and that the TCP segment X is in order. If the ULP uses a single CRC to cover both the header and the data, then any placement in the host buffer or any other action with respect to ULPDU Y+1 might be delayed until ULPDU Y+1 has been received in its entirety.

If the ULPDU is aligned (e.g., marker aligned, offset aligned or using other alignment arrangements) with respect to the transport protocol segment, then the operation of the NIC illustrated in FIG. 7 further simplifies. Since the ULPDU is aligned within the transport protocol segment, the boundaries of the ULPDU may be easily discernable with little or no calculation. Since a complete ULPDU is present in each transport protocol segment, the receiver need not store partial portions of the ULPDU or store partial CRC calculations. Thus, whether using the first method or the second method, the CRC machine might only be used once. In fact, after successfully checking the CRC, the receiver might only program the DMA once to place the ULPDU into, for example, the host memory. Furthermore, since a complete ULPDU is present in the transport protocol segment, the ULPDU may include enough information to program the DMA regardless of whether the transport protocol segment is in order or out of order. However, if the checking of the ULP CRC reveals an error, then data may need buffering as this may be an indication of, for example, unaligned ULPDUs or transport errors. The processing of unaligned ULPDUs in a non-flow-through NIC has already been described.

Figure 8:
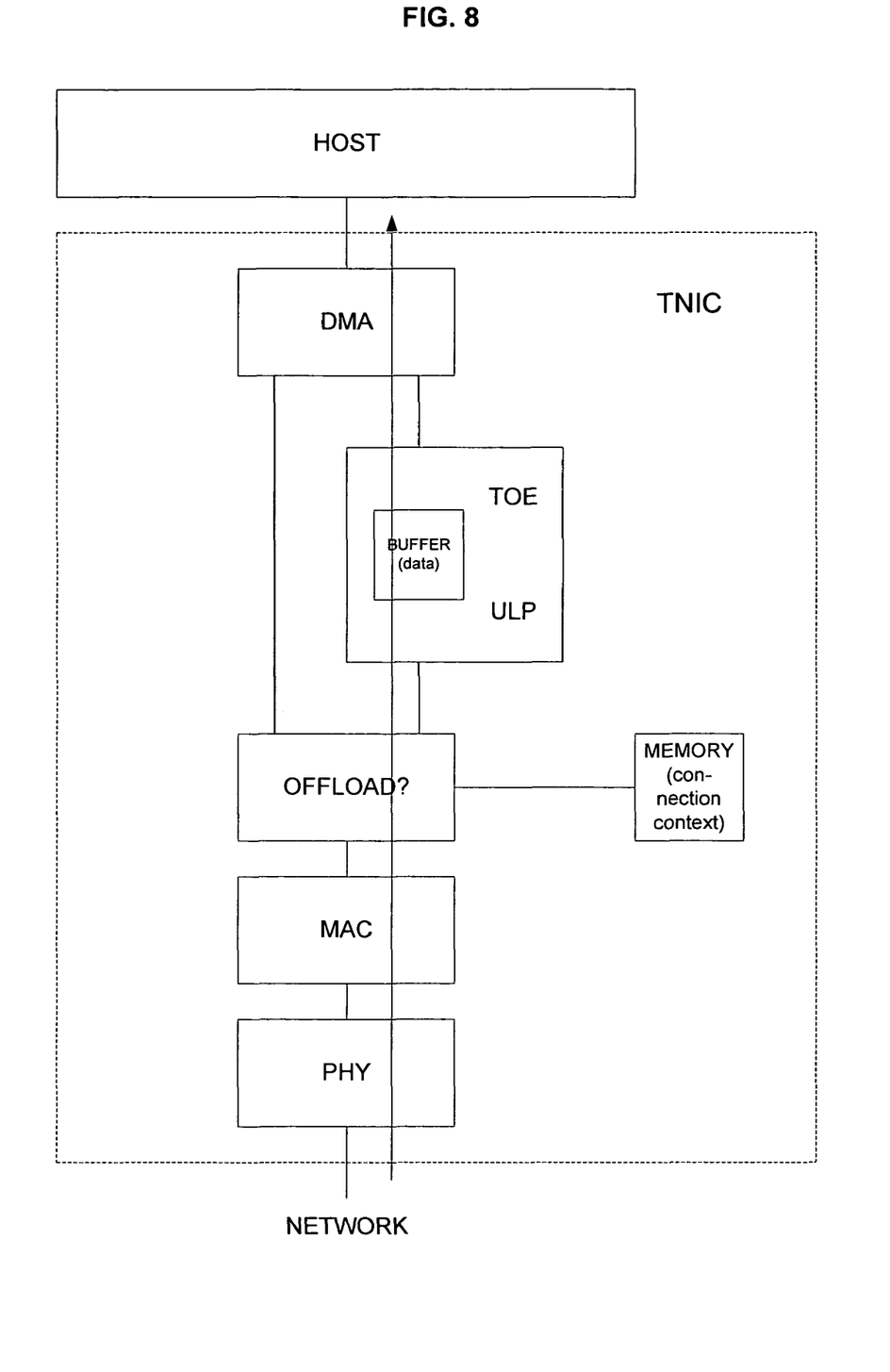
FIG. 8 shows an embodiment of a NIC according to the present invention.

FIG. 8 shows an embodiment of a flow-through offload NIC operation for ULP with CRC according to the present invention. The CRC machine may be in one or more of the blocks illustrated in FIG. 8.

With respect to FIG. 8, if the ULPDU is unaligned, then, for in-order TCP segments, the flow-through NIC operates similarly to the non-flow-through NIC. For out-of-order TCP segments, the flow-through NIC may buffer the out-of-order TCP segments, for example, in the buffer of the TOE/ULP block, drop the out-of-order TCP segments or pass the out-of-order TCP segments to a host software agent for processing along with the partial information it has accumulated such as, for example, a partial ULPDU Y, a partial CRC, etc. When the transport order is restored or based on other criteria, the host software may pass back to the NIC the parameters of the ULP such as, for example, start boundaries, a partial CRC, placement information obtained from its header, etc. The flow-through NIC may then commence processing of the ULPDUs.

If the ULPDU is aligned with the transport protocol segment, then the operation of the flow-through NIC illustrated in FIG. 8 further simplifies. The flow-through NIC may perform the ULP boundary calculation, the CRC checking and the DMA configuration once for an aligned ULPDU instead of multiple times for an unaligned ULPDU. The computation of the ULPDU boundaries may be further simplified since the ULPDU boundaries are aligned within the transport protocol segment. Alignment may also simplify the handling (e.g., computing ULP boundaries, checking CRC and placing in a host buffer) of out-of-order transport protocol segments carrying the aligned ULPDUs.

FIG. 8 shows an embodiment of a flow-through offload NIC operation for ULP with CRC according to the present invention. According to some embodiments of the present invention, the boundaries of the ULPDUs may be defined (e.g., easily determined with respect to) the boundaries of the transport protocol segments. The ULPDU boundaries may be determined for each in-order or out-of-order transport protocol segment. According to various embodiments of the present invention, the CRC may be performed on the whole ULPDU or the whole transport protocol segment payload. Partial CRC results and the storing of partial CRC results may thus be avoided.

In other embodiments of the present invention, the flow-through NIC may place, on the fly, the payload of every transport protocol segment in the host memory, instead of storing the data in a local memory and then forwarding the data to the host memory. In some embodiments according to the present invention, data may be placed in the host memory after ULP CRC or ULP CRCs are calculated and checked, thereby guaranteeing that ULP steering/placement information and the data are intact.

Figure 2:
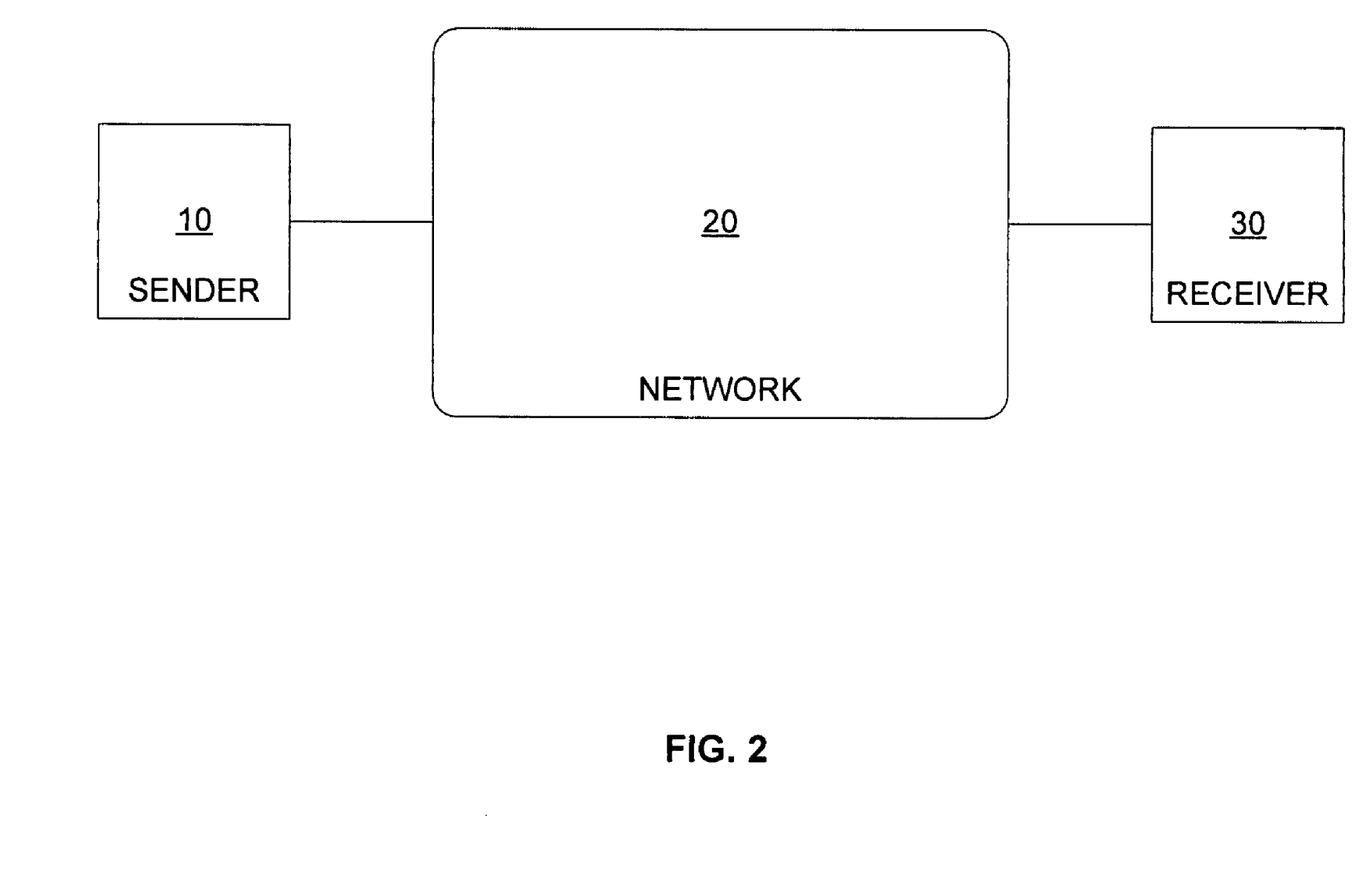
FIG. 2 shows an embodiment of a system that handles framing protocol data units (FPDUs) carried by TCP segments according to the present invention.

FIG. 2 shows an embodiment of a system that handles ULPDUs such as, for example, framing protocol data units (FPDUs) carried by transport protocol segments such as, for example, TCP segments according to the present invention. A sender system 10 (e.g., a client) may be coupled to a receiver system 30 (e.g., a server) via a network 20 such as, for example, the Internet. One or more TCP connections may be set up between the sender system 10 and the receiver system 30.

Figure 3:
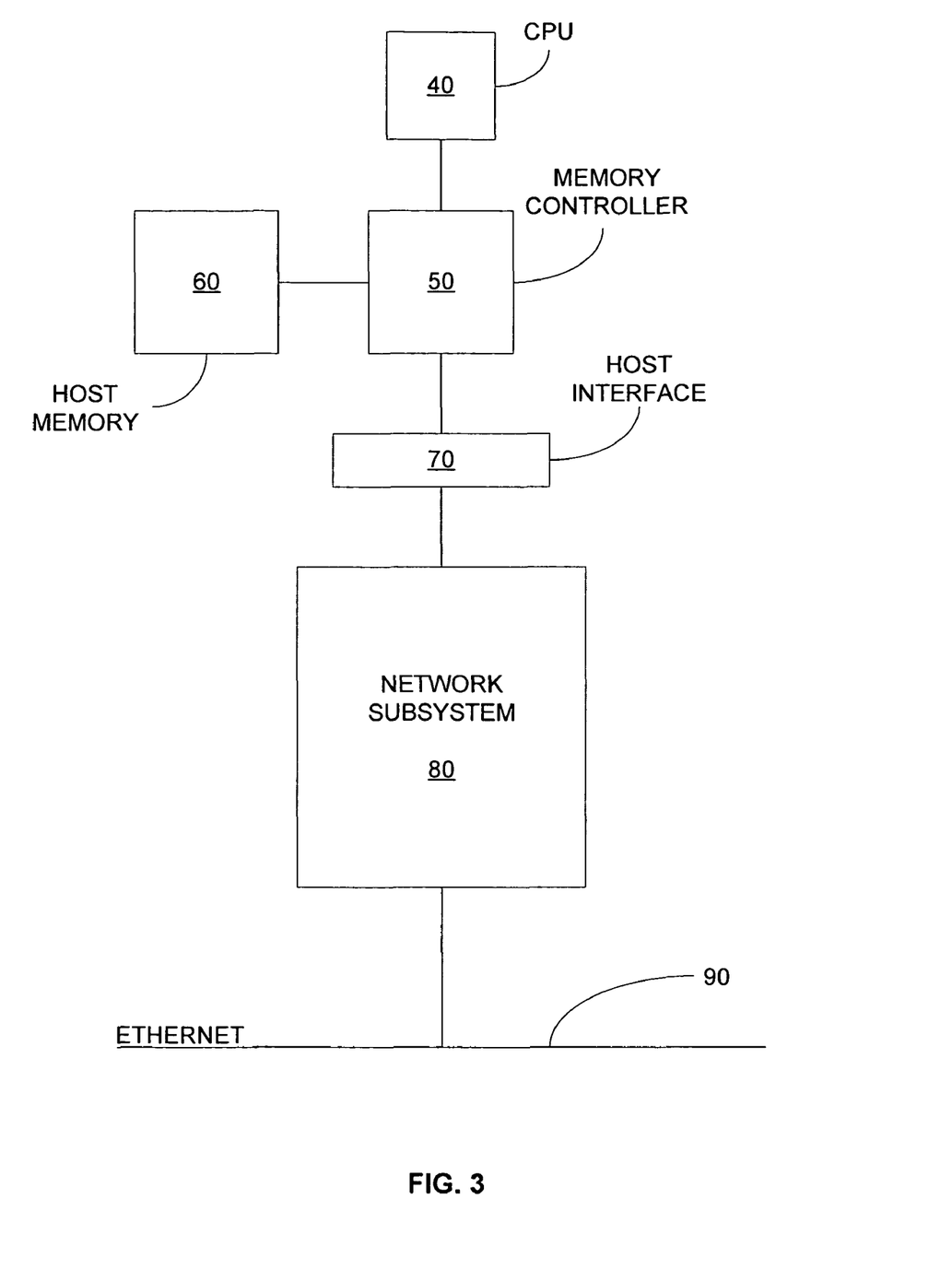
FIG. 3 shows an embodiment of a system that handles TCP frames in a flow-through manner according to the present invention.

FIG. 3 shows an embodiment of a system that handles TCP frames in a flow-through manner according to the present invention. The system may be part of, for example, the sender system 10 and/or the receiver system 30. The system may include, for example, a central processing unit (CPU) 40, a memory controller 50, a host memory 60, a host interface 70, network subsystem 80 and an Ethernet 90. The network subsystem 80 may be, for example, a NIC. The network subsystem 80 may include, for example, a TCP-enabled Ethernet Controller (TEEC) or a TCP offload engine (TOE). The network subsystem 80 may include, for example, a DMA engine and a CRC machine. The DMA engine and the CRC machine may be part of, for example, the TEEC or the TOE. The host interface 70 may be, for example, a peripheral component interconnect (PCI) or another type of bus. The memory controller 50 may be coupled to the CPU 40, to the host memory 60 and to the host interface 70. The host interface 70 may be coupled to the network subsystem 80.

Figure 4:
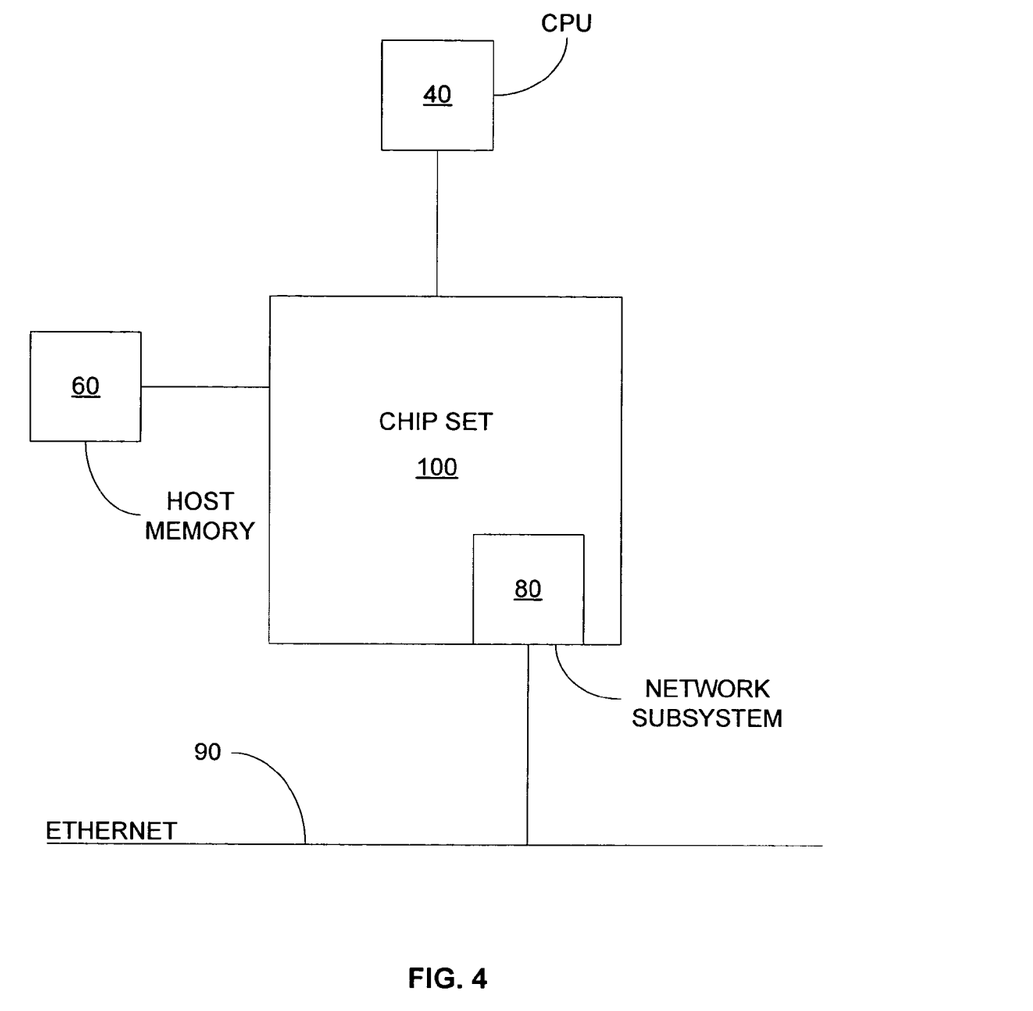
FIG. 4 shows another embodiment of a system that handles TCP frames in a flow-through manner according to the present invention.

FIG. 4 shows another embodiment of a system that handles TCP frames in a flow-through manner according to the present invention. The system may include, for example, the CPU 40, the host memory 60 and a chip set 100. The chip set 100 may include, for example, the network subsystem 80. The chip set 100 may be coupled to the CPU 40, to the host memory 60 and to the Ethernet 90. The network subsystem 80 of the chip set 100 may be coupled to the Ethernet 90. The network subsystem 80 may include, for example, the TEEC or the TOE which may be coupled to the Ethernet 90. The network subsystem 80 or the chip set 100 may include, for example, a DMA engine and a CRC machine. The DMA engine and the CRC machine may be part of, for example, the TEEC or the TOE. A dedicated memory may be part of and/or coupled to the chip set 100 and may provide buffers for context or data.

Although illustrated, for example, as a CPU and an Ethernet, the present invention need not be so limited to such exemplary examples and may employ, for example, any type of processor and any type of data link layer or physical media, respectively. Accordingly, although illustrated as coupled to the Ethernet 90, the network subsystem 80 may be adapted for any type of data link layer or physical media. Furthermore, the present invention also contemplates different degrees of integration and separation between the components illustrated in or described with respect to FIGS. 3 and 4.

In operation according to one embodiment of the present invention, the sender 10 may create TCP segments that include, for example, one or more complete FPDUs. The particular length of the FPDUs and the TCP segments may be subject to ULP or network constraints and considerations. In one embodiment, the sender 10 may be an MPA-aware-TCP sender that encapsulates at least one complete FPDU in each TCP segment. An FPDU may be a unit of data created by a ULP using a marker-based ULPDU aligned (MPA) framing protocol. Examples of MPA framing protocols may be found in, for example, U.S. patent application Ser. No. 10/230,643, entitled "System and Method for Identifying Upper Layer Protocol Message Boundaries" and filed on Aug. 29, 2002. The above-referenced U.S. patent application is hereby incorporated herein by reference in its entirety. Other examples of the MPA framing protocols may be found, for example, in conventional MPA framing protocols. An FPDU according to a particular MPA framing protocol may include, for example, an MPA length, an MPA payload, an MPA CRC and, optionally, one or more markers as appropriate.

The TCP segments may be transmitted to the receiver system 30 via, for example, the network 20. The network subsystem 80 may receive the TCP segments via, for example, the Ethernet 90. The network subsystem 80 may receive the TCP segments in order or out of order and may process the TCP segments in a flow-through manner. The network subsystem 80 may determine the boundaries of each FPDU and locate the control information and data information corresponding to each FPDU. The network subsystem 80 may then process the respective control information in order to place the data information directly inside the host memory 60. The network subsystem 80 may employ, for example, a TEEC or a TOE adapted to facilitate the placement of the data contained in the TCP segment into, for example, a temporary buffer, a ULP buffer or an application buffer residing in the host memory 60. For directly placing the data into the host memory 60, the network subsystem 80 may include, for example, a DMA engine. The network subsystem 80 may place the ULP data at a particular memory location, for example, in a ULP buffer residing in the host memory 60. Accordingly, whether the TCP segment is in order or out of order, the network subsystem 80 may copy the data, for example, from the Ethernet 90 to, for example, a determined buffer location of the ULP buffer residing in the host memory 60.

Figure 5:
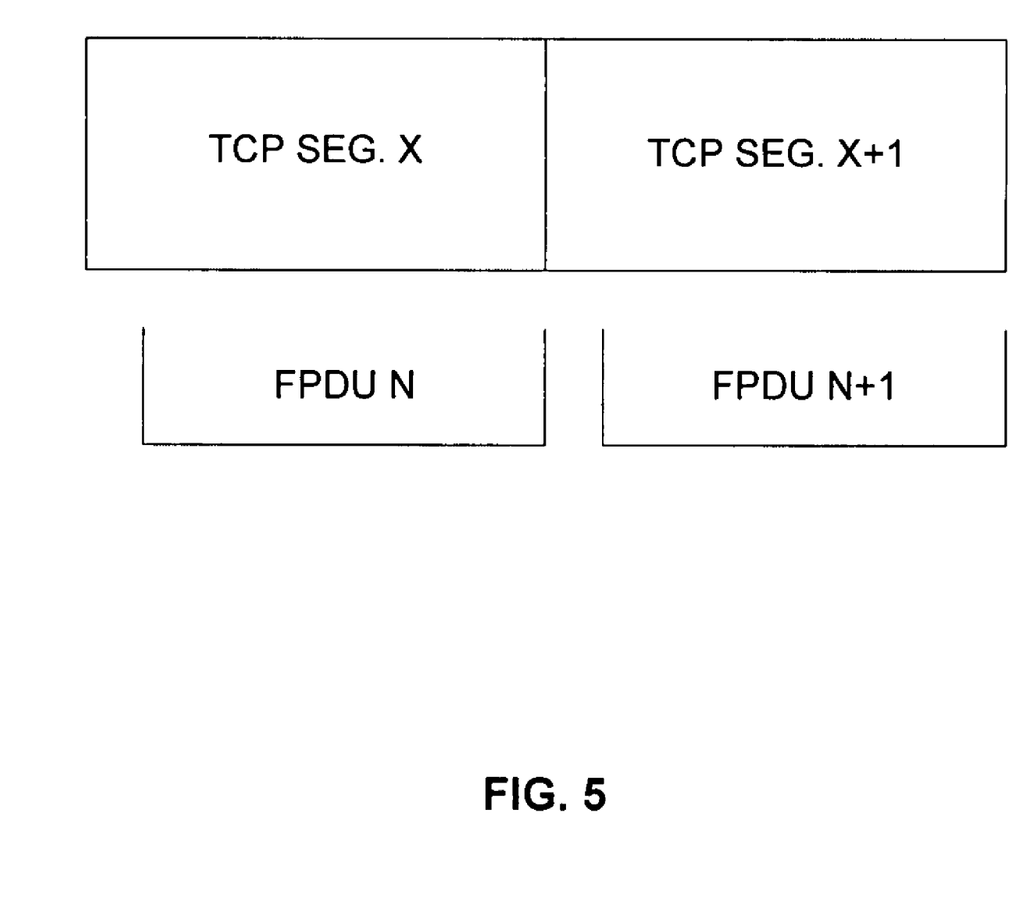
FIG. 5 shows an embodiment of an FPDU carried by a respective TCP segment according to the present invention.

FIG. 5 shows an embodiment of an FPDU carried by a respective TCP segment according to the present invention. The present invention also contemplates that each TCP segment may carry more than one FPDU. In some embodiments, the present invention may provide that a TCP segment may carry one or more complete FPDUs. In some embodiments, the FPDU may follow immediately after the TCP header. In other embodiments, the FPDU may follow the TCP header after a preset number of bytes. In yet another embodiment, the FPDU may follow the TCP header after a particular number of bytes. The particular number of bytes may be indicated by a field in a known location in the TCP segment or in the TCP byte stream.

Figure 6A:
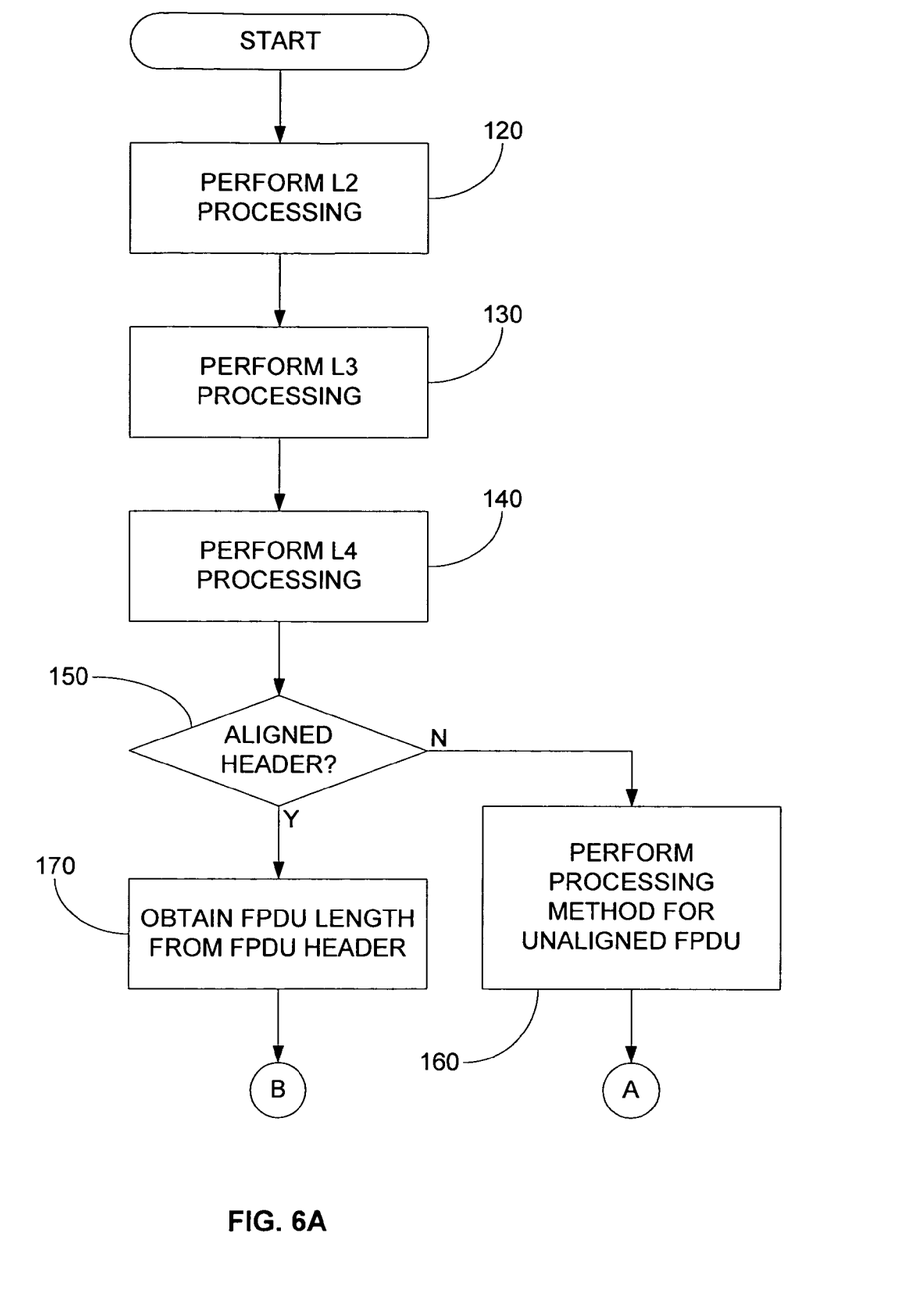
FIGS. 6A-B show an embodiment of a method that processes FPDU according to the present invention.
Figure 6B:
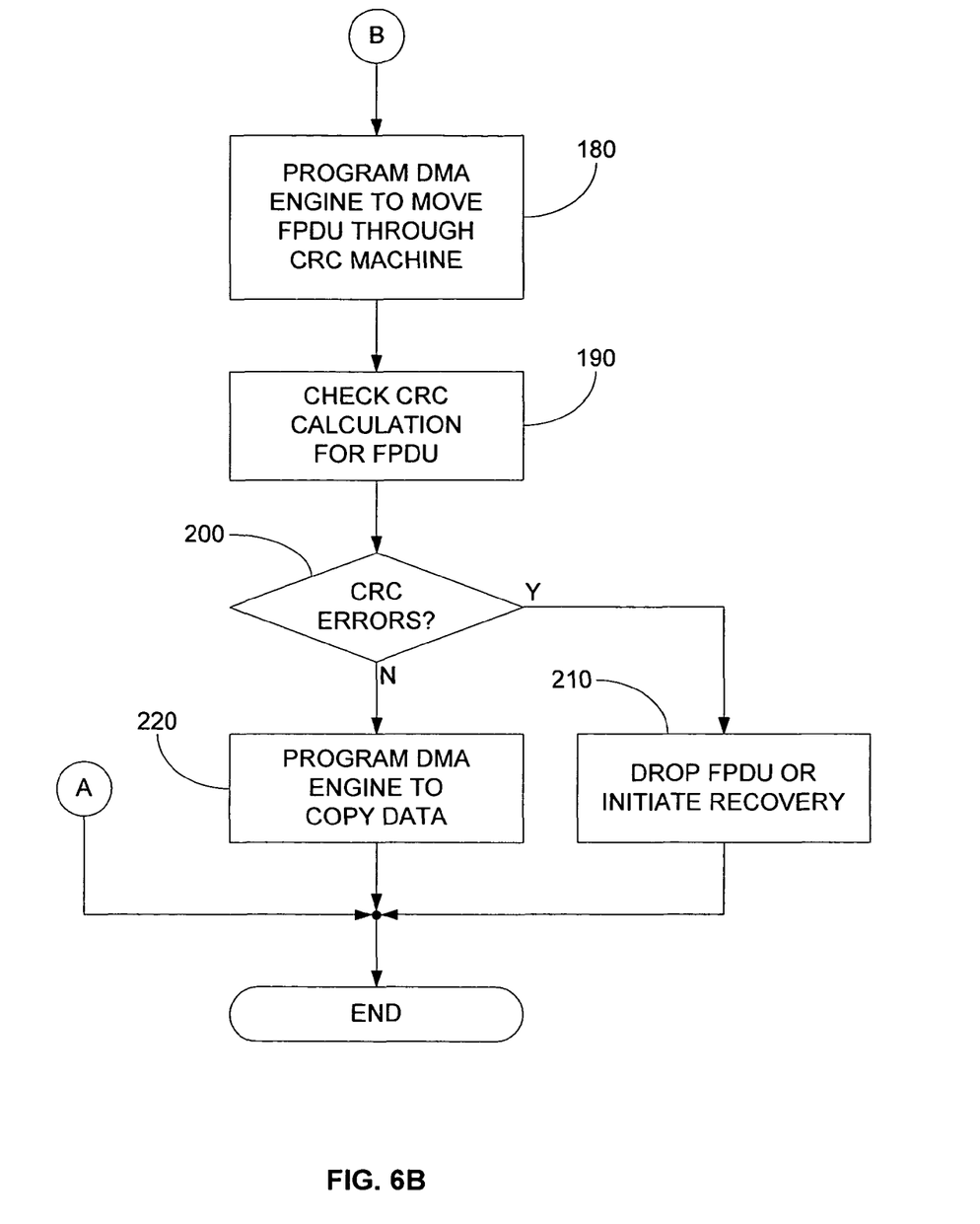

FIGS. 6A-B show an embodiment of a method that processes FPDU according to the present invention. In step 120, the network subsystem 80 performs L2 processing on an incoming frame from, for example, the network 20. Assuming that the IP datagram is not an IP fragment (i.e., the L2 frame contains one complete IP datagram), in step 130, the network subsystem may perform L3 processing on the IP datagram. If an IP fragment is present in the L2 frame, then IP fragments must first be reassembled in a local buffer before processing may continue. In step 140, the network subsystem 80 may perform L4 processing including, for example, TCP processing, header checks and checksum checks. In query 150, the network subsystem 80 may check for header alignment. In one embodiment, header alignment may be determined by analyzing the marker in the TCP segment according to, for example, an MPA framing protocol.

If the header is not aligned, then, in step 160, network subsystem 80 or other components of the receiver 30 may perform a processing method for unaligned FPDUs. In one embodiment, the process may be similar to the method that processes unaligned ULPDUs with some differences. For example, under a particular MPA framing protocol, information included in, for example, an MPA length field and one or more MPA markers may be used to locate a particular MPA header and to determine FPDU boundaries. The MPA header (or a ULP header it carries) may include, for example, information relating to a particular memory location (e.g., a memory address) in the host memory 60 in which data of the FPDU may be placed. In some embodiments according to the present invention, if MPA is not used and if the ULPDU is not aligned, then the NIC may perform additional operations as discussed above with respect to non-aligned ULPDUs If the header is aligned, then, in step 170, the boundaries of the FPDU including, for example, the location of the FPDU header and the FPDU payload may be determined. The FPDU length information may be obtained from, for example, the FPDU header. Step 170 may be performed whether the TCP segment is an in-order TCP segment or an out-of-order TCP segment. In step 180, a DMA engine may be programmed to move the FPDU data through a CRC machine. In step 190, the CRC calculation for the FPDU may be checked for errors. If the CRC check reveals an error, then, in step 210, the FPDU may be locally dropped or the ULP may initiate recovery. If the CRC check does not reveal an error, then, in step 220, the DMA engine may be programmed to copy data (e.g., Copy-Data(TCP segment number, host buffer address, length)) to, for example, a particular memory location in a temporary buffer, an ULP buffer or an application buffer residing in the host buffer 60.

In other embodiments according to the present invention, some of these steps can be performed substantially in parallel or in a different order. For example, if the ULPDU is aligned within a transport protocol segment, then the headers of the various processing layers (e.g., L2, L3, etc.) and the CRC may be easily located. The header information may be analyzed, at least in part, in parallel or in a different order. Thus, NIC architectures that include multiple processing layers may benefit substantially in configuration and in operation when the incoming transport protocol segments include aligned ULPDUs.

In various embodiments according to the present invention, the arrangements in FIGS. 2-4 may accommodate flow-through NIC architectures or non-flow-through NIC architectures. In some embodiments according to the present invention, FIGS. 2-4 may accommodate aligned ULPDUs (e.g., aligned MPA FPDUs or other aligned protocol data units) or unaligned ULPDUs (e.g., unaligned MPA FPDUs or other unaligned protocol data units). In some embodiments according to the present invention, FIGS. 2-4 may accommodate in-order transport protocol segments or out-of-order transport protocols segments.

With respect to some embodiments according to the present invention, the above-described processing of aligned ULPDUs, unaligned ULPDUs, in-order transport protocol segments or out-of-order transport segments by a flow-through NIC architecture may be applied in part or in whole to a non-flow-through NIC. Furthermore, the above-described processing of aligned ULPDUs, unaligned ULPDUs, in-order transport protocol segments or out-of-order transport segments by a non-flow-through NIC architecture may be applied in part or in whole to a flow-through NIC.

With respect to some embodiments according to the present invention, the processing of incoming frames from the network as set forth herein does not have to be accomplished in the order set forth herein. The present invention also contemplates processing incoming frames using a different order of processing steps. Moreover, the present invention also contemplates that some of the processing steps may be accomplished in parallel or in series.

One or more embodiments according to the present invention may benefit from one or more advantages as set forth below.

Substantial receiver optimizations may be achieved by implementing header alignment and carrying complete FPDUs. The optimizations allow for using substantially fewer buffers on the receiver system 30 (e.g., fewer buffers on a NIC of the network subsystem 80 or fewer buffers on a chipset 100 of the network subsystem 80) and fewer computations per FPDU. The optimizations may allow for the building of a flow-through receiver system 30 (e.g., a flow-through NIC of the network subsystem 80) that may enable TCP-based solutions to scale to 10 Gbps and beyond. The optimizations may find use, for example, in hardware implementations of receiver systems 30 that process, in an expedited manner, multiple protocol layers such as, for example, L2 (e.g., Ethernet), TCP/IP and ULP (e.g., MPA/DDP) on top of TCP. The optimizations provide even greater efficiencies as the network speed increases, thereby accentuating the performance of a hardware-based receiver system.

The alignment of one or more FPDUs in a TCP segment may provide greater flexibility with respect to the classification of an incoming TCP segment. For example, when the FPDUs are not aligned, the receiver system 30 may have to classify incoming traffic before it can calculate the FPDU CRC. However, if the FPDUs are aligned, then the operations order may be left to the discretion of the implementer.

The alignment of one or more FPDUs in a TCP segment may substantially simplify the receiver algorithm. For example, there may be no need or a reduced need to locally buffer portions of FPDUs or to access state information to determine FPDU boundaries. There may be no need or a reduced need to access state information before a CRC calculation commences, thereby reducing internal latencies. There may be no need or a reduced need to have separate DMA accesses through the CRC machine or to have separate DMA activity for moving data to a buffer in the host memory 60.

The alignment of one or more FPDUs in a TCP segment may provide efficiencies in processing in-order TCP segments and out-of-order TCP segments. For example, the receiver system 30 may use substantially the same mechanisms in either case. One of the few differences may occur, for example, in the accounting of the in-order TCP segments and the out-of-order TCP segments which may be handled separately. Header alignment and a guarantee that an integer number of complete FPDU in each TCP segment may result in the receiver system 30 performing direct data placement of out-of-order TCP segments with no need or a reduced need for buffering.

The reduced need for buffering may make hardware implementations feasible in the form of a NIC of the network subsystem 80 in which buffering may be supported by on-board memory. In fact, the reduced need of buffering may make hardware implementations feasible in the form of a single integrated chip in which buffering may be supported by on-chip memory.

The alignment of one or more FPDUs in a TCP segment may provide for receive buffers whose size does not scale with the number of connections. An aligned FPDU approach may be expected to scale more gracefully (i.e., less than linearly) as network speed increases. Furthermore, if the system interface of a network controller offers ample bandwidth compared with the network bandwidth, then the aligned FPDU approach may allow buffer size to be substantially indifferent to network speed.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A system, comprising:
a receiver that receives an incoming transport protocol segment (TPS), the incoming TPS comprising a TPS header, an aligned upper layer protocol (ULP) header, a complete ULP data unit (ULPDU), a marker header and a marker, the receiver comprising a buffer, the buffer being a size that does not scale approximately linearly with a network speed, a network bandwidth, or a number of connections,
wherein a direct memory access (DMA) engine of the receiver moves the complete ULPDU through a cyclical redundancy checking (CRC) machine and places the complete ULPDU into a host memory, and wherein the marker header is disposed between the aligned ULP header and the TPS header, and
wherein the marker of the incoming TPS is disposed in the complete ULPDU and backward points to the marker header of the same incoming TPS.

2. The system according to claim 1,
wherein the receiver comprises a network subsystem and the host memory,
wherein the network subsystem comprises the DMA engine and the CRC machine.

3. The system according to claim 2, wherein the network subsystem further comprises a network interface card (NIC) or a network controller.

4. The system according to claim 1, wherein the ULPDU comprises a framing protocol data unit (FPDU).

5. The system according to claim 4, wherein the FPDU comprises a data unit created by a ULP using a marker-based ULPDU aligned (MPA) framing protocol.

6. The system according to claim 1, wherein the aligned ULP header comprises an aligned FPDU header.

7. The system according to claim 6, wherein the aligned ULP header comprises the aligned FPDU header disposed adjacently to the TPS header of the incoming TPS.

8. The system according to claim 1, wherein the aligned ULP header is disposed a preset length away from the TPS header of the incoming TPS.

9. The system according to claim 1, wherein the aligned ULP header is disposed a predefined length away from the TPS header, the predefined length being related to information in a field in the incoming TPS.

10. The system according to claim 9, wherein the field comprises a marker field.

11. The system according to claim 1, wherein the receiver is a flow-through receiver.

12. The system according to claim 1, wherein the incoming TPS comprises a transmission control protocol (TCP) segment.

13. The system according to claim 12, wherein the TCP segment is part of a TCP byte stream.

14. The system according to claim 1, wherein the incoming TPS comprises information that is used to place the complete ULPDU in the host memory.

15. The system according to claim 1, wherein the receiver does not store partial cyclical redundancy check (CRC) values.

16. The system according to claim 1, wherein the incoming TPS comprises an out-of-order incoming TPS.

17. The system according to claim 1, wherein the receiver does not store only a portion of the complete ULPDU.

18. A method, comprising:
receiving an incoming transport protocol segment (TPS) in a buffer, the buffer being a size that does not scale approximately linearly with a network speed, a network bandwidth, or a number of connections, the incoming TPS comprising a complete framing protocol data unit (FPDU) and an FPDU header in a known position with respect to a TPS header, wherein a direct memory access (DMA) engine moves the complete FPDU through a cyclical redundancy check (CRC) machine, wherein the complete FPDU includes a marker, wherein the marker is not adjacent to the FPDU header, and wherein the marker of the incoming TPS backward points to the FPDU header of the same incoming TPS.

19. The method according to claim 18, wherein the FPDU header is adjacent to the TPS header.

20. The method according to claim 18, further comprising:
performing layer 2 (L2) processing, layer 3 (L3) processing and layer 4 (L4) processing on the incoming TPS via a network subsystem.

21. The method according to claim 20, further comprising:
obtaining FPDU length information from the FPDU header.

22. The method according to claim 21, further comprising:
programming the DMA engine to copy data of the complete FPDU from the network subsystem to a host memory.

23. The method according to claim 20, further comprising:
performing upper layer protocol (ULP) processing on the incoming TPS via the network subsystem,
wherein the L2 processing, the L3 processing, the L4 processing and the ULP processing can occur in parallel or in any order.

24. The method according to claim 23,
wherein the L2 processing, the L3 processing, the L4 processing and the ULP processing do not occur in the listed order in a receiver.

25. The method according to claim 23,
wherein the ULP processing, the L4 processing, the L3 processing and the L2 processing do no occur in the listed order in a transmitter.

26. The method according to claim 20, wherein the TPS comprises a plurality of complete FPDUs.

27. A system, comprising:
a receiver comprising a direct memory access (DMA) engine, a cyclical redundancy check (CRC) machine, and a buffer being a size that does not scale approximately linearly with a network speed, a network bandwidth, or a number of connections, wherein the receiver receives an incoming transport protocol segment (TPS), the incoming TPS comprising a marker, a marker header, a TPS header, an aligned upper layer protocol (ULP) header and a complete ULP data unit (ULPDU), wherein the marker header is disposed between the aligned ULP header and the TPS header, wherein the marker of the incoming TPS is disposed in the complete ULPDU and backward points to the marker header of the same incoming TPS, and wherein the receiver programs the DMA engine once to move the complete ULPDU through the CRC machine and place the complete ULPDU into a host memory.

28. The system according to claim 27,
wherein the receiver comprises a non-flow-through network interface card (NIC), and
wherein the DMA engine and the CRC machine are part of the non-flow-through NIC.

29. The system according to claim 28, wherein the non-flow-through NIC comprises a local memory.

30. The system according to claim 29, wherein the non-flow-through NIC performs a CRC calculation before or as the complete ULPDU is stored in the local memory.

31. The system according to claim 29, wherein the non-flow-through NIC performs a CRC calculation after the complete ULPDU is stored in the local memory.

32. The system according to claim 29, wherein the non-flow-through NIC performs a CRC calculation during a process by which the complete ULPDU is sent from the local memory to the host memory.

33. The system according to claim 29, wherein the complete ULPDU comprises a marker-aligned protocol data unit.

34. The system according to claim 27,
wherein the receiver comprises a flow-through network interface card (NIC), and
wherein the DMA engine and the CRC machine are part of the flow-through NIC.

35. The system according to claim 34, wherein the flow-through NIC comprises the buffer.

36. The system according to claim 35, wherein the flow-through NIC performs a CRC calculation before or as the complete ULPDU is stored in the buffer.

37. The system according to claim 36, wherein the CRC calculation is a ULP CRC calculation.

38. The system according to claim 34, wherein the complete ULPDU comprises a marker-aligned protocol data unit.

39. A method, comprising:
(a) receiving an incoming transport protocol segment (TPS) in a buffer, the buffer being a size that does not scale approximately linearly with a network speed, a network bandwidth, or a number of connections, the TPS comprising a TPS header, a marker, a complete framing protocol data unit (FPDU) and an FPDU header in a known position with respect to the TPS header, wherein a direct memory access (DMA) engine is programmed to move the complete FPDU through a cyclical redundancy check (CRC) machine and copy data of the complete FPDU to a memory, wherein the marker is inserted in the complete FPDU, wherein the marker is not adjacent to the FPDU header, and wherein the marker of the incoming TPS backward points to the FPDU header of the same incoming TPS;
(b) performing layer 2 (L2) processing on the incoming TPS;
(c) performing layer 3 (L3) processing on the incoming TPS;
(d) performing layer 4 (L4) processing on the incoming TPS; and
(e) performing ULP processing on the incoming TPS.

40. The method according to claim 39, wherein at least two of the performing of (b), (c), (d) and (e) occurs concurrently.

41. The method according to claim 39, wherein the performing of (b), (c), (d) and (e) occurs in any order.

* * * * *